April 24, 1934.   A. TOMAN   1,956,405
COMBINATION KITCHEN TOOL
Filed March 27, 1933
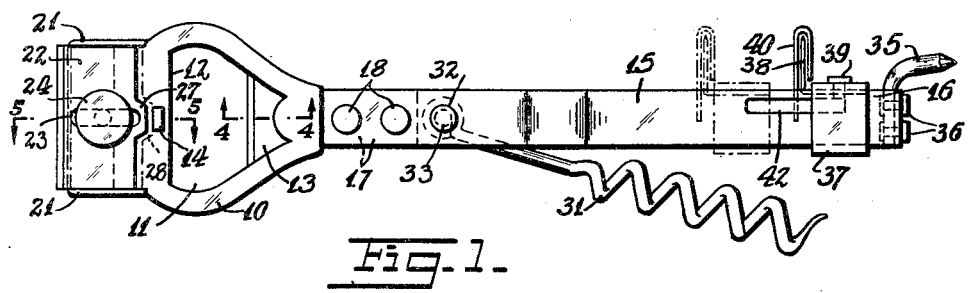
Fig. 1.
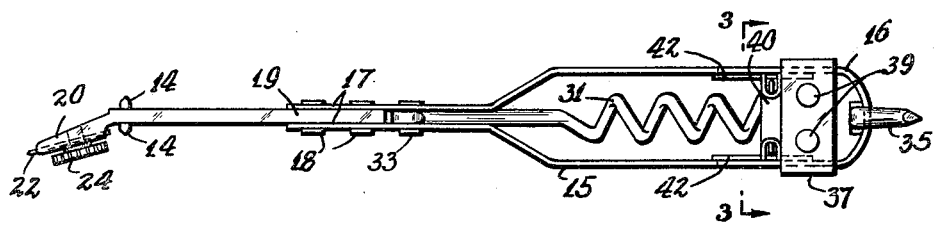
Fig. 2.
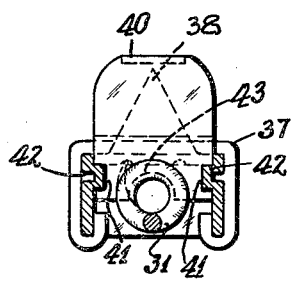
Fig. 3.
Fig. 4.   Fig. 5.
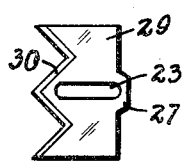
Fig. 6.
INVENTOR
ARPAD TOMAN
BY
ATTORNEY Patented Apr. 24, 1934

1,956,405

UNITED STATES PATENT OFFICE 1,956,405

COMBINATION KITCHEN TOOL

Arpad Toman, New York, N. Y.

Application March 27, 1933, Serial No. 662,879

4 Claims. (Cl. 30—3)

This invention relates to new and useful improvements in a combination kitchen tool.

The invention has for an object the construction of a combination kitchen tool which is characterized by specific features relating to an arrangement whereby the tool may be used in the kitchen for various purposes. For example, the tool may be used to remove the crown caps from bottles, may be used to cut vegetables or other objects, may be used to open up tin cans, and remove the corks from bottles.

More particularly the invention contemplates a novel construction of a tool in a manner so that it is provided with a handle of substantially U-shape upon which a pointed element is secured at the bend and a carriage slidably mounted and carrying a knife adapted to coact with the point so as to cut out the top of a tin can in any diameter depending upon the adjustment of the position of the carriage.

Furthermore in detail an arrangement is proposed whereby a cover is provided for the blade of the knife which is permanently secured over the blade of the knife except in certain positions of the carriage when it may be removed.

Still further the invention contemplates the provision of tracks arranged upon the sides of the handle preferably by depressing portions of the sides, with an arrangement whereby the tracks are associated with the cover for the blade in a manner so that the cover is held against removal but may be slid along until its disengagement with the tracks whereupon it may be removed from the blade.

Still further the invention contemplates the novel arrangement of a cork screw portion pivotally arranged upon the handle in a manner so that it may assume a position collapsed into the handle or be extended therefrom to be used.

Still further the invention contemplates an arrangement whereby the turns of the cork screw may be engaged against the cover for the blade or knife in a manner so as to prevent sliding of this cover to a position in which it may be removed. Therefore it is necessary that the cork screw be first moved to release the cover before the cover can be moved into a position in which it may be removed from the blade.

Another one of the objects of this invention is the novel arrangement of the body of the tool so that it may efficiently remove the crown caps from bottles.

Still further the invention contemplates the mounting of a blade upon one extremity of the body in a manner so that it may assume any retracted position when not in use or an extended position ready for use. This blade may have a straight or serrated cutting edge.

As another object of this invention it is proposed to construct an article as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a plan view of a combination kitchen tool constructed according to this invention.

Fig. 2 is an edge elevational view of Fig. 1.

Fig. 3 is a sectional view taken on the line 3—3 of Fig. 2.

Fig. 4 is a fragmentary sectional view taken on the line 4—4 of Fig. 1.

Fig. 5 is a fragmentary sectional view taken on the line 5—5 of Fig. 1.

Fig. 6 is a plan view of another blade for use in the device.

A combination kitchen tool according to this invention comprises a flat body 10 with an opening 11 adapted to engage over the top and one side of a crown cap. The opening 11 has a straight front side 12 and diametrically opposite a small rib 13 intermediate the top and bottom slides of the body for engagement beneath the bottom edge of the said crown cap. Pegs 14 project from the top and bottom slides of the flat body 10 immediately adjacent the straight side 12 of the opening 11 and are adapted to act as an abutment for resting upon the top of the crown cap while the small rib portion 13 engages beneath one edge so as to more efficiently pry the crown cap off from a bottle. A handle 15 is attached upon the rear of the body 10.

The handle 15 is constructed from a strip of material which is bent at the center 16 and which has its ends 17 attached respectively on the top and bottom sides of the flat body 10 and serve to accomplish the attachment. The rear portion of the flat body 10 is formed with a reduced portion 19 which engages between the ends 17 as clearly shown in Figs. 1 and 2.

A lip 20 projects from the front end of the flat body 10 at an inclination clearly shown in Fig. 2 and at the sides is provided with guide portions 21 adapted to act against the sides of a blade such as 22 to guide the blade to slide inwards and outwards. The blade 22 is provided with an elongated central opening 23 through which a set screw 24 passes and threadedly engages into the lip 20 so that the blade may be clamped in various extended positions. The lip 20 is provided with a recess 25 near the front portion thereof forming a shoulder 26 against which the rear edge of the blade 22 may engage so as to better serve to hold the blade in an extended position. The blade 22 is shown to have a small projection 27 at the rear side which is adapted to engage into a circular recess portion 28 at the center of the shoulder 26 so that the blade 22 may snugly rest within the recess 25. An intermediate extended position of the blade 22 is shown in full lines in Fig. 1 and the blade is disposed at an inclination wherein the front portion thereof rests upon the front edge of the lip 20 while the rear portion rests upon the shoulder 26. In the fully retracted position indicated by the dot and dash lines in Fig. 1 the blade 22 has the rear projection 27 engaged against the projection 14 which limits the inward position of the blade. In this inward position the outer edge of the blade is slightly below and behind the front edge of the lip 20.

The blade 22 may be used to cut or chop vegetables. Different types of blades may be substituted for it for example, the blade illustrated in Fig. 6. This blade is designated by reference numeral 29 and is shown provided with a plurality of teeth 30 along the front cutting edge. The blade also has a central elongated opening 23 for accommodating the set screw 24 and another projection 27 similar and for the same purpose as the projection on the rear edge of the blade 22. The blade 29 may be used to grate or cut vegetables or other objects in the kitchen into small pieces, and to chop ice.

A cork screw 31 is formed on one end with an eye portion 32 engaging about a rivet 33 mounted through the handle 15 in a manner so that the cork screw 31 may be pivoted from a position between the sides of the handle to an extended position. In Fig. 2 the cork screw is shown engaged between the sides of the handle while in Fig. 1 it is shown partially extended.

The combination kitchen tool is also provided with an arrangement whereby the tops of tin cans may be cut open. This arrangement comprises a pointed element 35 attached upon the bent portion 16 of the handle. The element 35 is directed immediately towards the rear and to one side of the handle 15. Another portion of the pointed element 35 extends down immediately adjacent the inner face of the bend 16 and is secured in place by several rivets 36.

The sides of the handle 15 are substantially parallel from the bent portion 16 to points but a small distance from the rivet 33. Between the parallel portions of the handle 15 a carriage 37 is slightly mounted. This carriage comprises a strip of material which is engaged over the top edges of the parallel sides of the handle 15 and has portions extended downwards outside of the parallel sides of the handle 15 and then portions bent around and upwards so as to slidably engage the carriage upon the handle.

A blade 38 with a pointed top is mounted upon the carriage by reason of the lower end thereof being bent beneath the top portion of the carriage 37 and secured thereto by several rivets 39. The blade 38 is pointed upwards at substantially right angles to the handle 15. The arrangement is such that the pointed member 35 may be forced into substantially the center of the end of a tin can and then the blade 38 adjusted to any diameter by reason of sliding the carriage 37 along upon the sides of the handle so that thereafter the blade 38 may be forced down into the top of the tin can and by turning the tool around in a circle caused to cut out a circular portion in the top of the tin can.

A novel arrangement is provided to cover or shield the blade 38 when it is not in use. This cover comprises a strip of material 40 bent over the top of the blade 38 and extended straight downwards in between the parallel sides of the handle 15. The portion of the cover 40 which is located in between the handle is formed with cutouts 41 at opposite sides engaging tracks 42 formed along the sides of the handle. The tracks 42 are formed by embossing or pressing in a portion of the sides of the handle 15. The tracks 42 extend only for a short distance from substantially the bent end 16 of the handle towards the front. The lower edge of the cover 40 which is located in between the parallel sides of the handle is formed with a circular cutout portion 43 adapted to engage in between the turns of the cork screw 31 so as to hold the carriage 37 from being moved forwards and rearwards.

Normally the cover 40 cannot be removed and therefore cannot accidentally disengage from place. To remove the cover 40 so that the can opener may be used it is first necessary that the cork screw 31 be slightly pivoted outwards so that its turns do not engage against the bottom ends of the cover 40. Then next the carriage 37 should be slipped rearwards to a position in which the cutout portions 41 disengage from the tracks 42. The dot and dash lines in Fig. 1 indicate a moved position of the carriage 37 in which the cover 40 is free from the tracks. Then the cover may be lifted vertically and so disengaged from the tool.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a combination kitchen tool, a handle comprising a strip of material bent at the middle and having parallel sides, a pointed member attached upon the bend and extended longitudinally rearwards immediately above one edge of the handle, a carriage comprising a strip of material extended across the sides of the handle and down the sides of the handle and over the bottom edges of the sides of the handle so as to slidably mount the carriage, a blade mounted upon said carriage and having an upward directed point, tracks upon the inner sides of said handle extending from substantially the bend to a small distance frontwards, a cover over said blade and comprising a strip extended over the blade and down one side of the blade in between the sides of said handle and having slots at opposite sides engaging said tracks so as to prevent removal of the cover except in positions of the carriage wherein the cover is free from said tracks.

2. In a combination kitchen tool, a handle comprising a strip of material bent at the middle and having parallel sides, a pointed member attached upon the bend and extended longitudinally rearwards immediately above one edge of the handle, a carriage comprising a strip of material extended across the sides of the handle and down the sides of the handle and over the bottom edges of the sides of the handle so as to slidably mount the carriage, a blade mounted upon said carriage and having an upward directed point, tracks upon the inner sides of said handle extending from substantially the bend to a small distance frontwards, a cover over said blade and comprising a strip extended over the blade and down one side of the blade in between the sides of said handle and having slots at opposite sides engaging said tracks so as to prevent removal of the cover except in positions of the carriage wherein the cover is free from said tracks, said tracks comprising portions of the sides of said handle embossed or impressed inwards.

3. In a combination kitchen tool, a handle comprising a strip of material bent at the middle and having parallel sides, a pointed member attached upon the bend and extended longitudinally rearwards immediately above one edge of the handle, a carriage comprising a strip of material extended across the sides of the handle and down the sides of the handle and over the bottom edges of the sides of the handle so as to slidably mount the carriage, a blade mounted upon said carriage and having an upward directed point, tracks upon the inner sides of said handle extending from substantially the bend to a small distance frontwards, a cover over said blade and comprising a strip extended over the blade and down one side of the blade in between the sides of said handle and having slots at opposite sides engaging said tracks so as to prevent removal of the cover except in positions of the carriage wherein the cover is free from tracks, and a member with coils hingedly mounted between the sides of said handle and adapted to assume a position between the sides of the handle and in said position adapted to engage against the lower edge of said cover so as to prevent sliding of said carriage.

4. In a combination kitchen tool, a handle comprising a strip of material bent at the middle and having parallel sides, a pointed member attached upon the bend and extended longitudinally rearwards immediately above one edge of the handle, a carriage comprising a strip of material, extended across the sides of the handle and down the sides of the handle and over the bottom edges of the sides of the handle so as to slidably mount the carriage, a blade mounted upon said carriage and having an upward directed point, tracks upon the inner sides of said handle extending from substantially the bend to a small distance frontwards, a cover over said blade, and means associated with said tracks for preventing removal of the cover except in one given position of the carriage.

ARPAD TOMAN.